April 30, 1929.  J. W. KAYE  1,710,877
STEAM TRAP
Filed Feb. 3, 1927  2 Sheets-Sheet 1

WITNESSES

Inventor
JAMES W. KAYE
By Richard B. Owen
Attorney

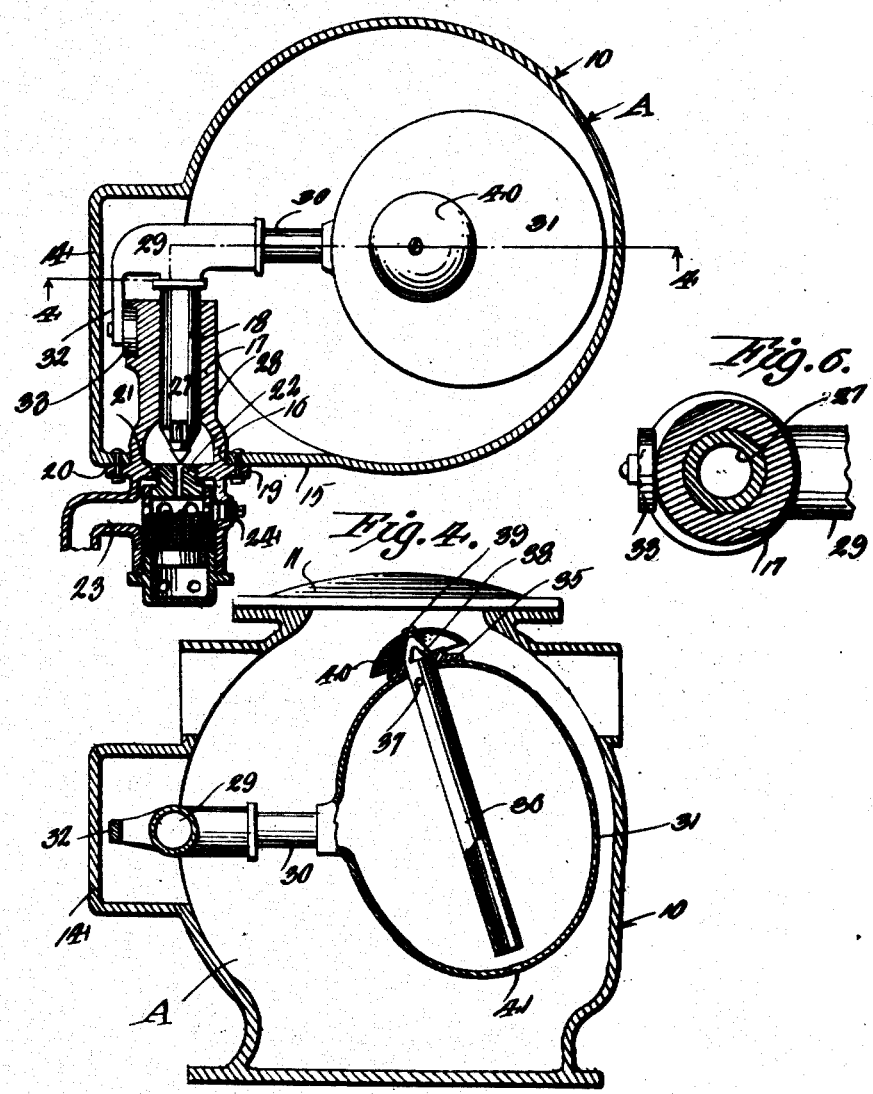

Patented Apr. 30, 1929.

1,710,877

UNITED STATES PATENT OFFICE.

JAMES W. KAYE, OF WEST ORANGE, NEW JERSEY.

STEAM TRAP.

Application filed February 3, 1927. Serial No. 165,712.

This invention relates to novel means for relieving a steam line of air and water and one of the primary objects of the present invention is to provide a novel steam trap having a float controlled valve for the steam inlet, the steam being used for buoying the float, which also acts to equalize the pressure inside and outside the float.

Another salient feature of the invention is to provide a novel connection between the float and the valve, whereby the valve will be positively moved on and off its seat and with a rotary motion, so as to insure the proper seating of the valve at all times.

A further object of the invention is the provision of a novel buoyant float having novel means for allowing the entrance of steam into the float for driving the water of condensation from the float.

A further object of the invention is the provision of a novel non-clogging strainer arranged at the steam inlet, so as to prevent the entrance of foreign matter into the trap.

A further object of the invention is the provision of a combined strainer, valve seat and valve in the inlet chamber of the trap, the parts being so arranged as to permit convenient removal and adjustment thereof without interfering with other parts of the trap.

A still further object of the invention is to provide improved means of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed, and illustrated in the accompanying drawings, in which:

Figure 1 is a top plan view of the improved trap,

Figure 2 is a side elevation of the same,

Figure 3 is a horizontal section through the trap taken on the line 3—3 of Figure 2, looking in the direction of the arrows, showing the novel valve mechanism and the novel strainer, Figure 4 is a vertical section through the trap taken on the line 4—4 of Figure 3, looking in the direction of the arrows showing the novel construction of the float, Figure 5 is a detail view showing the arrangement of the float in elevation, and Figure 6 is a detailed section through the float, taken on line 6—6 of Figure 5, looking in the direction of the arrows.

Referring to the drawings in detail, wherein similar reference characters designate corresponding parts throughout the several views, the letter A generally indicates the improved trap, which comprises a casing or float chamber 10 constructed from any desired material having a removable cover plate 11 therefor, which can be secured in place in any desired way, such as by the use of cap screws 12. The casing 10 or float chamber adjacent to the upper end thereof is provided with water outlets 13. The chamber or casing 10 at a point below the water outlets is provided with a lateral chamber 14, which communicates with the interior of the casing and this chamber is provided with a substantially flat outer wall 15 having an opening 16 into which is fitted a pressure chamber 17.

The pressure chamber 17 extends into the lateral chamber 14, and terminates short of the vertical axis of the casing 10 and is provided with an inwardly directed bore 18. An annular flange or collar 19 is formed on the pressure chamber adjacent to the outer end thereof, and this collar or flange forms a stop for engaging the wall 15 of the lateral chamber 14 and the flange is bolted or otherwise secured to the wall 15, as at 20. The interior of the pressure chamber, inward of the bore 18 thereof, is provided with an internal partition 21, which partition removably receives a valve seat 22 having a polygonal extension on its face forming a nut. The pressure chamber 17 outward of the valve seat 22 is provided with a laterally extending steam inlet 23 and diametrically opposite the steam inlet, the pressure chamber is provided with a blow-off hole 24 which can receive a suitable plug. A sediment trap 25 is inserted in the chamber through a suitable opening in the pressure chamber and the trap is provided with a head having suitable openings 26 therein for receiving a spanner wrench or manipulating handle. The inner end of the trap 25 fits over the nut extension on the valve seat 22 whereby upon removal of the trap the valve seat can be removed therewith. The sediment trap 25 receives a suitable non-clogging screen and the steam is adapted to flow through the screen and then through the valve seat. Dirt and the like then falls to the bottom of the trap, and the trap can then be conveniently removed for cleaning purposes when desired. The steam enters at the top of the chamber and passes through the screen, the sediment falls to the bottom of the trap and is blown through the blow off hole 24, when this blow off hole is open. The high velocity of the steam blows downward and blows the sediment through the blow off hole. The valve seat 22 is made removable whereby different sizes of valve seats can be substituted therefor. The pressure chamber can be turned in the opening 16 by placing the bolts 20 in different openings, which causes the motion arm to move the hollow spindle in or out for adjustment.

The bore 18 of the pressure chamber 17 slidably and rotatably receives a hollow valve stem 27 having loosely mounted on its inner end a valve 28 for the seat 22. The outer end of the hollow valve stem 27 is rigidly connected to the motion arm 29, to which is secured the float arm 30 of the float 31. The float arm 30 extends into the casing or float chamber 10 as clearly shown in Figure 4 of the drawings. A right-angularly extending foot 32 is formed on the arm 29 and is provided with an anti-friction roller 33 mounted in the spiral groove 34 formed in the outer face of the pressure chamber 17. It is obvious that when the float 31 raises or lowers, that the same will rock on the valve stem as a fulcrum and this rocking movement will move the stem in or out according to the direction of the movement of the float owing to the travel of the anti-friction roller 33 in the groove 34. This provides for the seating and unseating of the valve.

The float 31 can be formed of copper or any desired non-corrodable material and its upper end is provided with a sleeve or opening 35 into which is fitted a tube 36, terminating adjacent to the lower end of the float. The upper end of the tube 36 inside of the float 31, is provided with an air escape opening 37. The extreme upper end of the tube which projects out of the float 31 is contracted and is provided with outlet openings 38 and carries a support 39 for a bell 40 which projects over the top of the float.

In operation of the trap, at the start, when the float 31 is in a lowered position, due to gravity, any water of condensation that may be in the line will flow through the open valve from the pipe 23 into the float 30. The weight of the water will continue to hold the float in its lowered position and the valve open. The steam in the line 23, will follow the water of condensation and flow into the float and force the water in the float out through the tube 36 over the float into the casing 10. The float has great enough capacity to admit enough steam to create sufficient buoyant force to raise the float and close the valve before the water is entirely discharged from the float through the discharge tube, thus leaving the tube water sealed. If the trap is functioning properly, the float is continuously rising and falling (breathing as it is termed). This means that the trap is continuously trying the line for condensate; if condensate enters, the valve space opens until steam enters in sufficient quantity to close the valve; if steam is right up to the trap, the valve is closed again. No steam is blown out through the trap, even when the trap discharges the condensate, because the entrance of steam in the float closes the valve before the water seal is broken on the end of the discharge tube 36.

As stated the normal position of the float 31 is at the bottom of the chamber with the valve 28 pulled open. As the water to be drained passes through the hollow spindle or valve stem into the float, the float becomes water-logged and stays at the bottom until all of the water is discharged. When the steam enters the float it forces out the water through the tube 36, out under the bell 40, causing the condensation to flow downward over the float without any commotion. When all the condensation is discharged, the float becomes buoyant and thus rises and closes the valve 28 on the seat 22. When the steam passing through the float condenses, the water flows into the float through the opening 41 formed in the bottom of the float and discharges any air through the opening 37. The float falls down and opens the valve 28 and the same action is again repeated.

As long as the steam, water or air flows into the trap, it continues to work as described above, even if only a small amount of water is discharged. If the rate of condensation is extremely heavy, the float can set itself in such a position as to discharge the water in a steady stream. It can readily be seen, that although a high pressure is had at the inlet of the valve, the pressure on the body of the trap is only what is being discharged against. When the trap is discharging against atmospheric pressure, the trap will operate with the cover plate 11 removed.

The steam used as the buoyant means equalizes pressure inside and outside of the float. Owing to the fact that the valve stem is given a rotary motion, a regrinding effect is given the valve and seat, and the valve seat can be readily adjusted by simply turning the same in the threaded flange 21 after the sediment trap has been removed. If anything happens to the mechanism of the trap, the valve will blow open as the pressure is against the valve.

From the foregoing description, it can be seen that I have provided a novel useful trap of a very simple and novel construction, which will act under all conditions, and which can be readily cleaned when necessary or desired.

Changes in details may be made without departing from the spirit or the scope of this invention, but what I claim as new, is:—

1. A steam trap comprising a float chamber, a pressure chamber extending into the float chamber having a valve seat, a steam inlet, the pressure chamber also having a bore leading to the valve seat, and a hollow valve stem slidably and rotatably mounted in the bore, a hollow float, a float arm connected with the valve stem for movement therewith, a leg on the arm having an anti-friction roller, the pressure chamber being provided exteriorly with a spiral groove for receiving the roller, and means for permitting the flow of steam through the stem and into the float and exteriorly of the same.

2. A steam trap comprising a float chamber, a pressure chamber extending into the float chamber having a valve seat, a bore on one side of the valve seat and, a steam trap on the other side, a slidable and rotatable hollow valve stem in said bore having a valve for the seat, a hollow float arm communicating with the valve stem, a hollow float carried by the float arm and communicating therewith, a leg on said arm having an anti-friction roller, the pressure chamber being provided exteriorly with a spiral groove to receive the roller, a tube extending into the hollow float and terminating adjacent to the inner end of the same, and a bell extending over the outer end of the tube and float chamber, the float chamber being provided with an outlet adjacent to the upper end thereof.

3. A steam trap comprising a float chamber having a lateral enlargement on one side thereof, a pressure chamber extending into the enlargement having a valve seat, a bore on one side of the seat and a steam inlet on the other side, a hollow valve stem slidably and rotatably mounted on the bore, a valve loosely carried by said stem for the seat, the exterior of the pressure chamber having a spiral groove, a hollow float arm secured to the valve stem, a hollow float carried by and communicating with said arm, a laterally projecting leg on the arm having an anti-friction roller fitted in said groove, the float being provided with a water inlet at its lower end, a tube extending into the float from the upper end thereof terminating adjacent to the lower end of the float, the tube having an outlet adjacent to the upper end thereof and a bell extending over the tube and exteriorly of said float, the chamber having water outlets, and a removable sediment strainer fitted into the pressure chamber arranged between the inlet and valve seat.

4. A steam trap comprising a float chamber having a lateral projection, a pressure chamber fitted in the lateral projection provided with an adjustable and removable valve seat at a point intermediate its ends, the chamber having a bore communicating with the valve seat and a laterally extending steam inlet on the other side of the seat, the chamber having an opening directly in front of the valve seat, a screen sediment chamber fitted in said opening arranged between the inlet and valve seat, a hollow valve stem slidably and rotatably mounted in the bore, a valve loosely carried by the inner end of said hollow stem for the valve seat, the pressure chamber being provided exteriorly with a spiral groove, a hollow float arm connecting with a hollow stem and communicating therewith, a hollow float carried by the hollow float arm and communicating therewith, a laterally extending leg on the arm having an anti-friction roller mounted in said groove, a float having an opening adjacent to the lower end thereof, a tube extending through the upper end of the float terminating adjacent the said opening, a bell carried by the upper end of the tube overlying the same and a float, said float chamber having a removable cover and water outlet adjacent to the upper end thereof.

5. In a steam trap, a casing constituting a float chamber, a housing fitted in the float chamber constituting a pressure chamber, an adjustable and removable valve seat carried by the pressure chamber at a point intermediate its ends, the pressure chamber having a bore communicating with the valve seat and a laterally extending steam inlet on the outer side of the casing, the pressure chamber having an opening directly in front of the valve seat, a screened sediment chamber fitted in said opening arranged between the inlet and valve seat, said screen being disposed directly in front of the valve seat and carried thereby, a valve for the seat, a float in the float chamber, and means for operating said valve from the float.

In testimony whereof I affix my signature.

JAMES W. KAYE.